(12) United States Patent
Utsumi et al.

(10) Patent No.: US 7,122,925 B2
(45) Date of Patent: Oct. 17, 2006

(54) AUTOMOTIVE DYNAMOELECTRIC MACHINE

(75) Inventors: Yoshinobu Utsumi, Tokyo (JP); Hideki Morikaku, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/991,483

(22) Filed: Nov. 19, 2004

(65) Prior Publication Data

US 2005/0110352 A1 May 26, 2005

(30) Foreign Application Priority Data

Nov. 20, 2003 (JP) ............................. 2003-390793

(51) Int. Cl.
*H02K 11/00* (2006.01)
*H02K 5/22* (2006.01)
(52) U.S. Cl. .................... 310/71; 310/68 B; 310/239
(58) Field of Classification Search .................. 310/89, 310/91, 68 B, 71, 239, 242
See application file for complete search history.

(56) References Cited

U.S. PATENT DOCUMENTS

| 4,157,854 | A | * | 6/1979 | Beauch ..................... 439/15 |
| 4,705,983 | A | | 11/1987 | Franz et al. |
| 6,586,858 | B1 | * | 7/2003 | Finkle ...................... 310/233 |
| 2001/0033111 | A1 | | 10/2001 | Choi |
| 2003/0042813 | A1 | * | 3/2003 | Morikaku et al. ............ 310/91 |
| 2004/0232793 | A1 | * | 11/2004 | Fujita et al. ........... 310/156.43 |

FOREIGN PATENT DOCUMENTS

| EP | 1286451 A2 | 2/2003 |
| FR | 2802032 A1 | 6/2001 |
| FR | 2838884 A1 | 10/2003 |
| JP | 9-65620 A | 3/1997 |
| JP | 2003-61312 A | 2/2003 |

* cited by examiner

*Primary Examiner*—Tran Nguyen
(74) *Attorney, Agent, or Firm*—Sughrue Mion, PLLC

(57) ABSTRACT

An accommodating space is formed on an end surface at a first axial end of a rear bracket so as to envelop an end portion region of a shaft, and a brush holder and a sensor unit are disposed in the accommodating space. A brush connector unit and a sensor connector unit are disposed so as to project out of the accommodating space, and electrical connection between brushes and the brush connector unit and signal connection between the sensor unit and the sensor connector unit are performed inside the accommodating space.

4 Claims, 9 Drawing Sheets

AUTOMOTIVE DYNAMOELECTRIC MACHINE

BACKGROUND OF THE INVENTION

1. Field of the Invention

The present invention relates to an automotive dynamoelectric machine having a rotor position detecting apparatus for detecting a rotation angle of a rotor.

2. Description of the Related Art

In conventional automotive dynamoelectric machines, a rotor position detecting apparatus is mounted to a tip portion of a shaft so as to be accommodated in and fixed to an accommodating portion formed on an outer peripheral surface of a rear bracket, and detects a rotation angle of a rotor. A brush apparatus is fixed to an inner wall surface of the rear bracket so as to face slip rings fixed to an outer peripheral surface of the shaft, and supplies a field current to a rotor coil in the rotor through the slip rings. (See Patent Literature 1, for example.)

Patent Literature 1: Japanese Patent Laid-Open No. 2003-061312 (Gazette)

In conventional automotive dynamoelectric machines, the brush apparatus, which is a resin-molded part, is disposed in the vicinity of a stator, which is a heat source, and heat degradation of the brush apparatus has been a problem.

In automotive dynamoelectric machines of this kind, a brush apparatus connector, which is a resin-molded part, is disposed so as to project radially outside the rear bracket from the brush apparatus, and a power line from an external power source is connected to the brush apparatus connector. Thus, this brush apparatus connector is disposed in the vicinity of the stator, which is a heat source, and heat degradation of the brush apparatus connector has also been a problem.

SUMMARY OF THE INVENTION

The present invention aims to solve the above problems and an object of the present invention is to provide an automotive dynamoelectric machine enabling heat degradation of a brush holder and a brush connector unit to be suppressed by accommodating a brush apparatus in a rotor position detecting apparatus accommodating portion formed on an outer peripheral surface of a rear bracket in order to separate the brush holder and the brush connector unit from a stator constituting a heat source.

In order to achieve the above object, according to one aspect of the present invention, there is provided an automotive dynamoelectric machine wherein an accommodating portion is formed on an end surface at a first axial end of a housing so as to surround an end portion region of a shaft, a brush holder and a sensor unit are disposed inside the accommodating portion, a brush connector unit and a sensor connector unit are disposed so as to project out of the accommodating portion, and electrical connection between a brush and the brush connector unit and signal connection between the sensor unit and the sensor connector unit are performed inside the accommodating portion.

According to the present invention, the brush holder is accommodated together with the sensor unit inside the accommodating portion formed on the end surface at the first end of the housing. Thus, the brush holder, the sensor unit, the brush connector unit, and the sensor connector unit are separated from a stator constituting a heat source, suppressing heat degradation of the brush holder, the sensor unit, the brush connector unit, and the sensor connector unit.

In addition, the sensor unit and the sensor connector unit are separated from a magnetic circuit portion, improving noise tolerance.

DETAILED DESCRIPTION OF THE PREFERRED EMBODIMENTS

Embodiment 1

Figure 1:
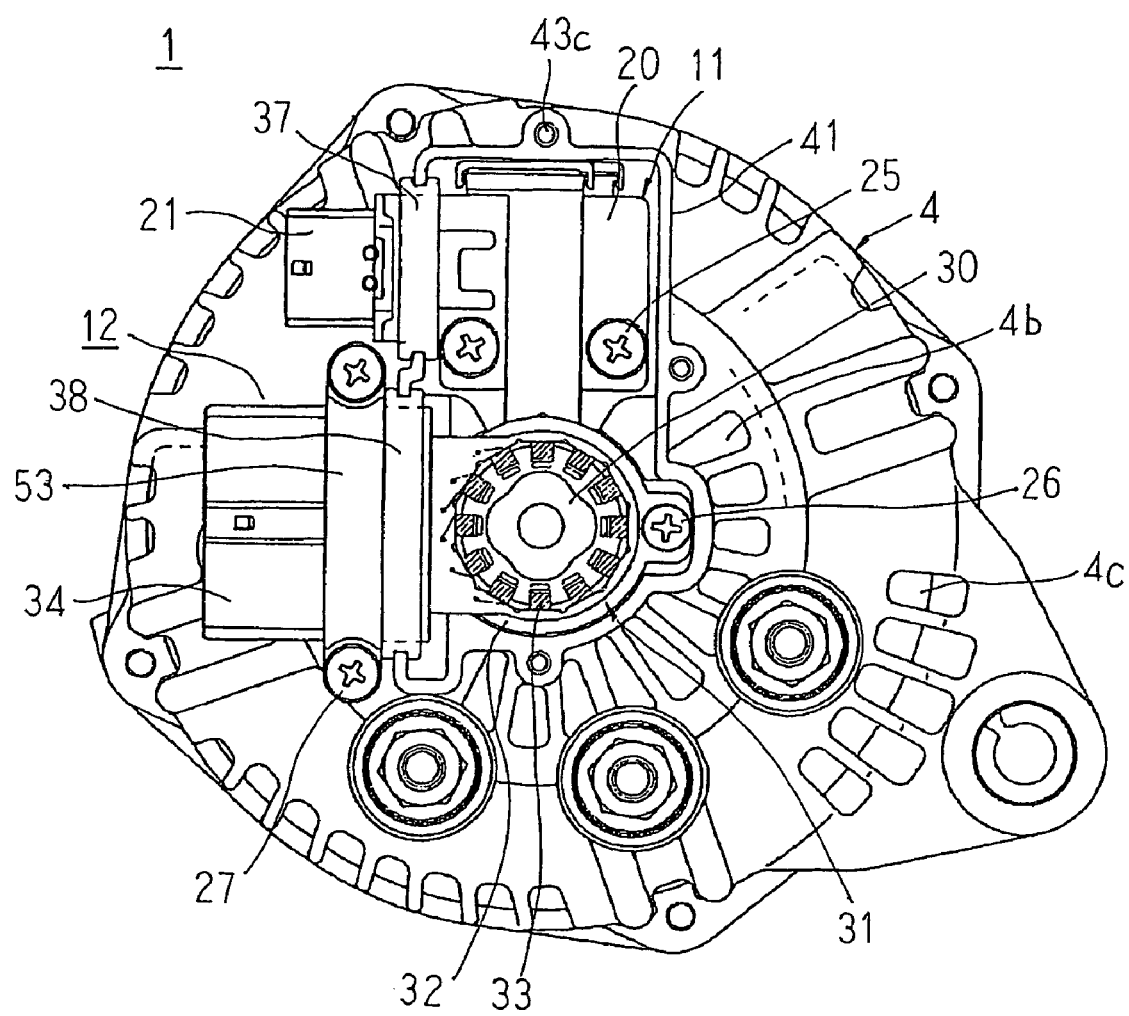
FIG. 1 is a rear-end end elevation showing an automotive dynamoelectric machine according to Embodiment 1 of the present invention.
Figure 2:
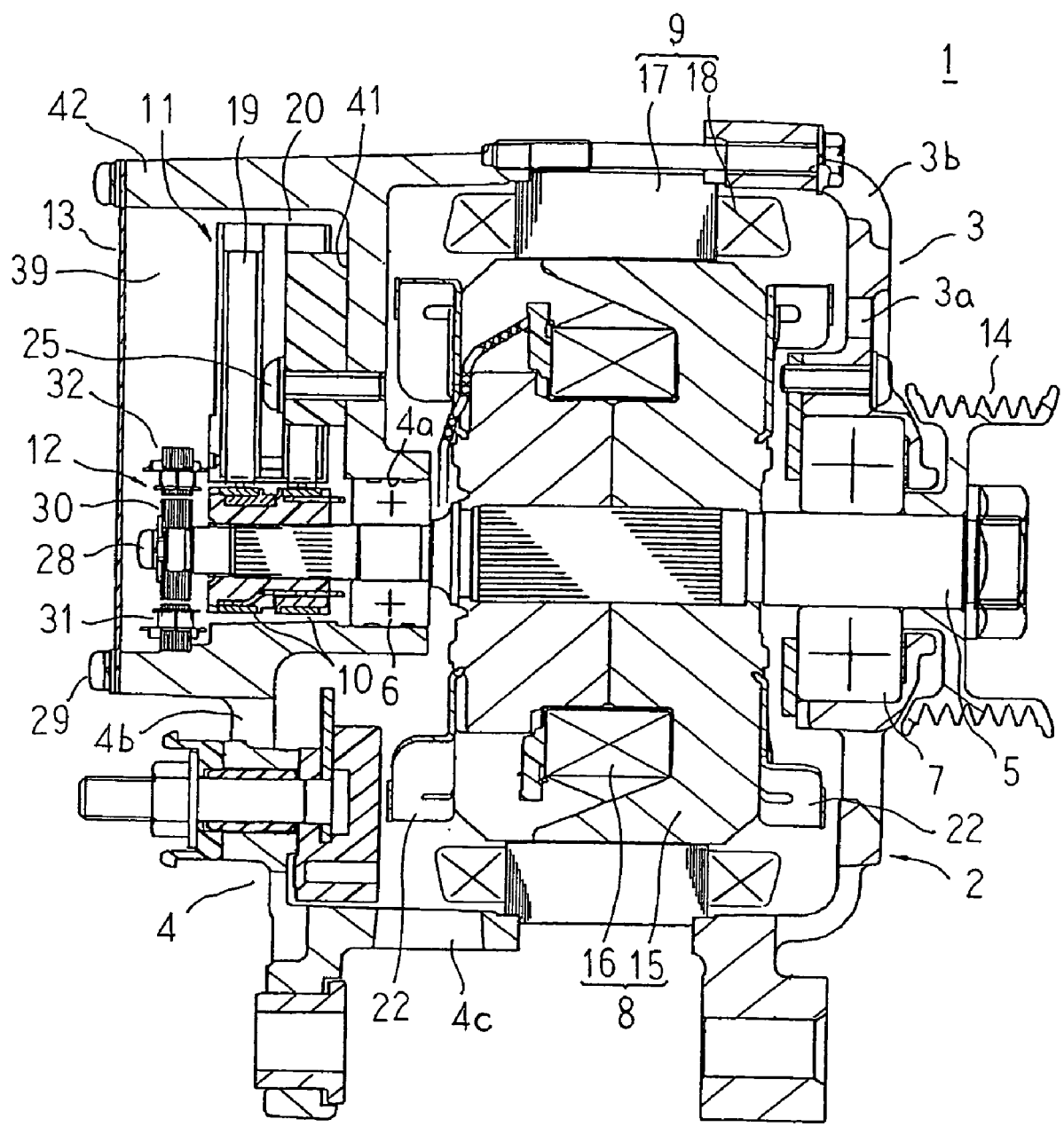
FIG. 2 is a longitudinal section showing the automotive dynamoelectric machine according to Embodiment 1 of the present invention.
Figure 3:
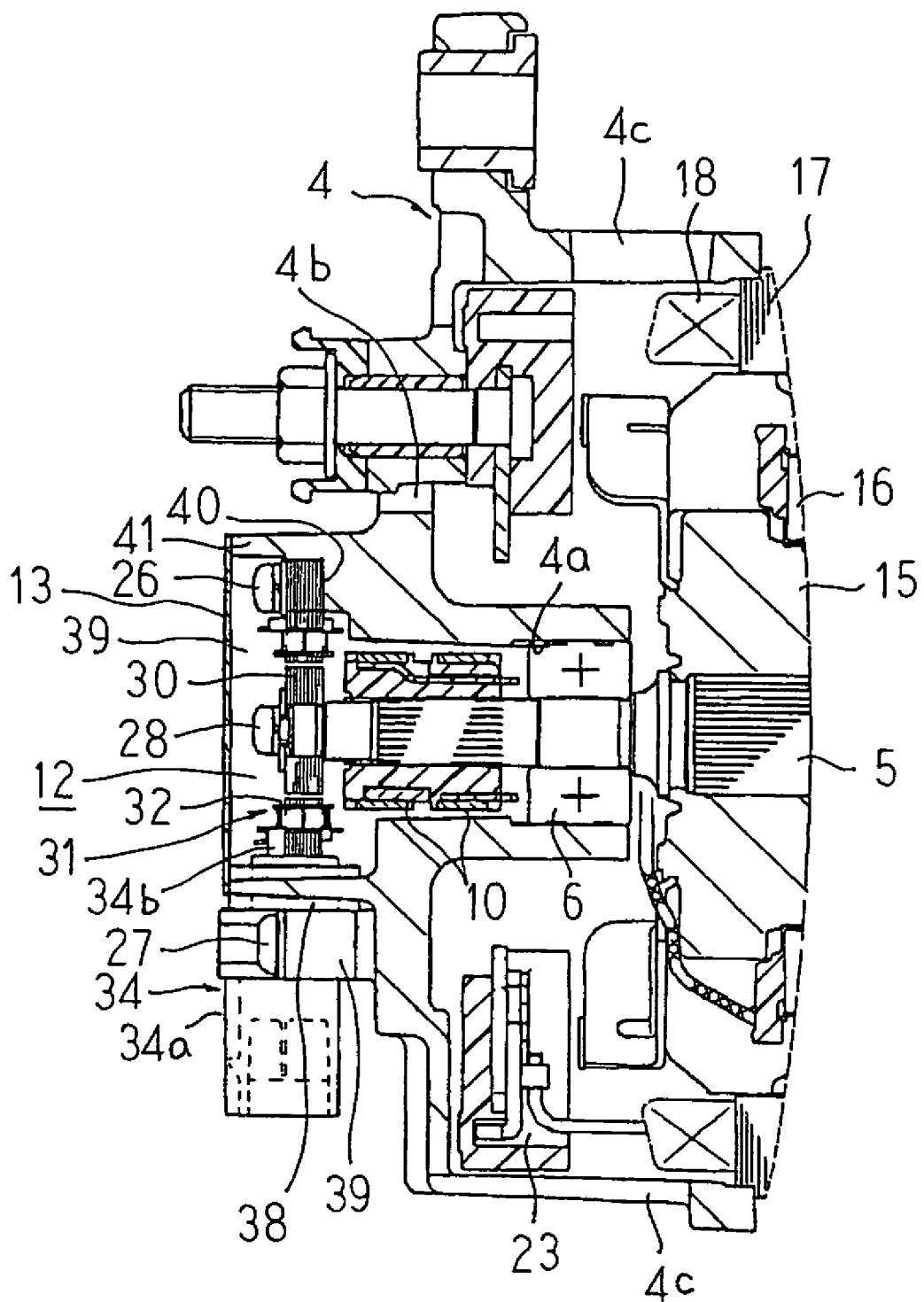
FIG. 3 is a cross section showing a vicinity of a rotor position detecting apparatus of the automotive dynamoelectric machine according to Embodiment 1 of the present invention.
Figure 4:
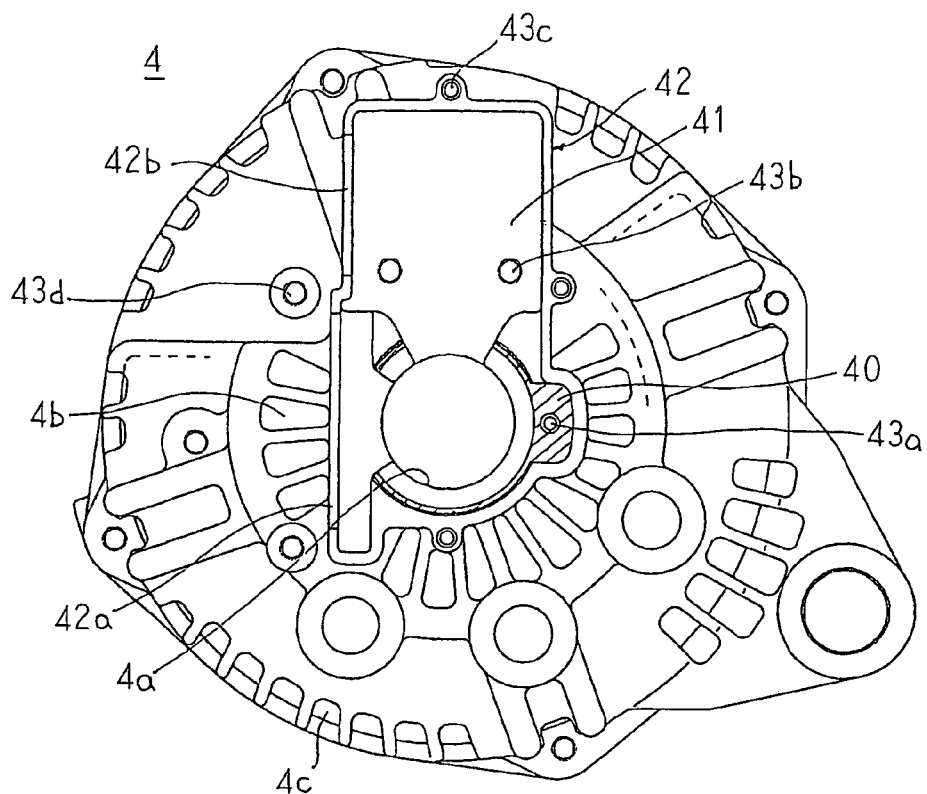
FIG. 4 is a rear-end end elevation showing a rear bracket in the automotive dynamoelectric machine according to Embodiment 1 of the present invention.
Figure 5A:
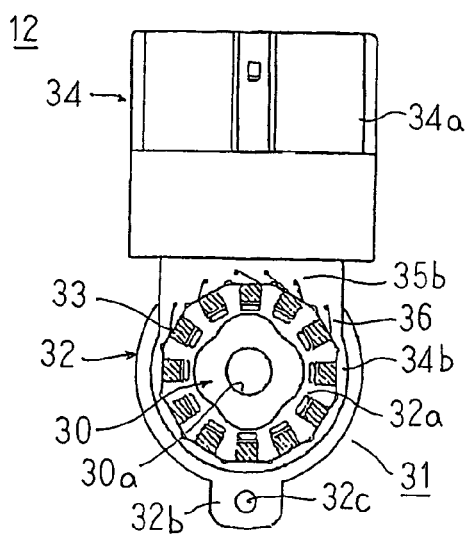
FIG. 5A is a front elevation explaining a configuration of the rotor position detecting apparatus in the automotive dynamoelectric machine according to Embodiment 1 of the present invention.
Figure 5B:
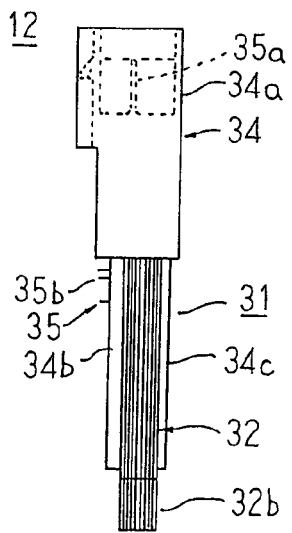
FIG. 5B is a side elevation explaining the configuration of the rotor position detecting apparatus in the automotive dynamoelectric machine according to Embodiment 1 of the present invention.
Figure 6A:
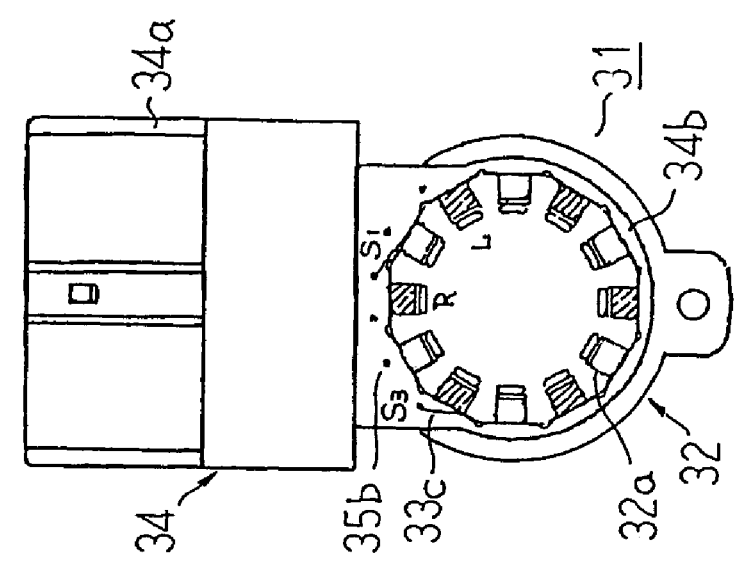
FIG. 6A is a diagram explaining a construction of a sensor coil of the rotor position detecting apparatus in the automotive dynamoelectric machine according to Embodiment 1 of the present invention.
Figure 6B:
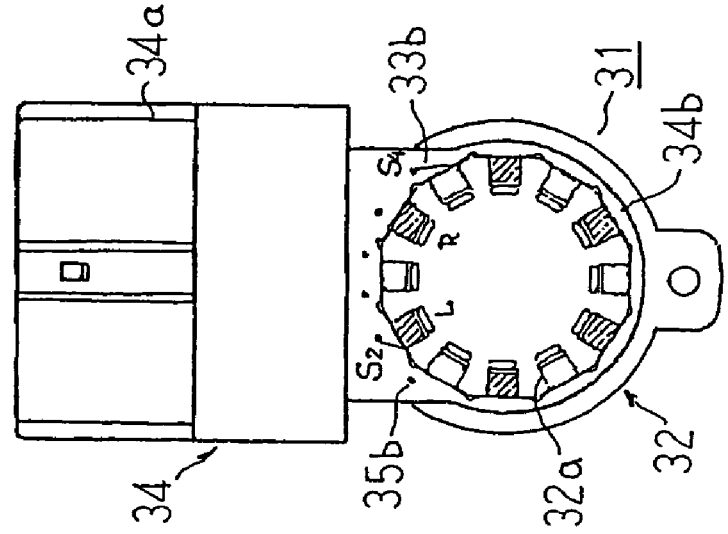
FIG. 6B is a diagram explaining the construction of the sensor coil of the rotor position detecting apparatus in the automotive dynamoelectric machine according to Embodiment 1 of the present invention.
Figure 6C:
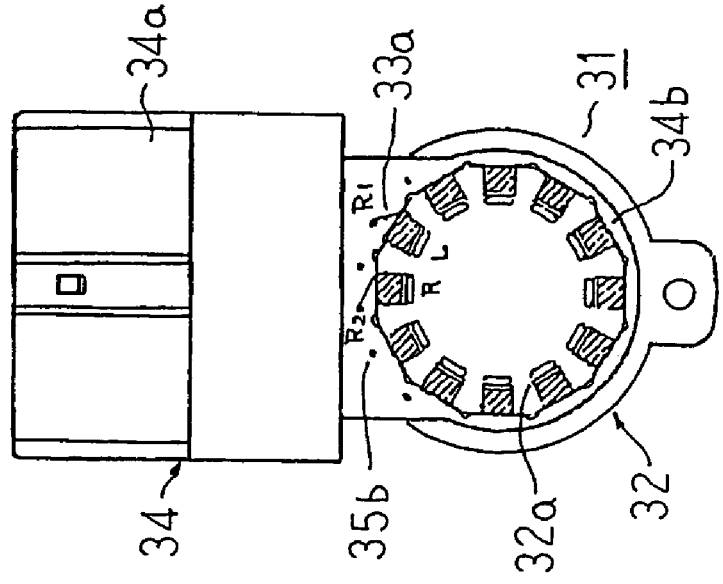
FIG. 6C is a diagram explaining the construction of the sensor coil of the rotor position detecting apparatus in the automotive dynamoelectric machine according to Embodiment 1 of the present invention.

FIG. 1 is a rear-end end elevation showing an automotive dynamoelectric machine according to Embodiment 1 of the present invention, FIG. 2 is a longitudinal section showing the automotive dynamoelectric machine according to Embodiment 1 of the present invention, and FIG. 3 is a cross section showing a vicinity of a rotor position detecting apparatus of the automotive dynamoelectric machine according to Embodiment 1 of the present invention. FIG. 4 is a rear-end end elevation showing a rear bracket in the automotive dynamoelectric machine according to Embodiment 1 of the present invention, and FIGS. 5A and 5B are diagrams explaining a configuration of the rotor position detecting apparatus in the automotive dynamoelectric machine according to Embodiment 1 of the present invention, FIG. 5A being a front elevation thereof and FIG. 5B being a side elevation thereof. FIGS. 6A to 6C are diagrams explaining a construction of a sensor coil of the rotor position detecting apparatus in the automotive dynamoelectric machine according to Embodiment 1 of the present invention. Moreover, FIG. 1 shows a state in which an end plate has been removed.

In FIGS. 1 to 3, an automotive dynamoelectric machine 1 includes: a housing 2 composed of a front bracket 3 and a rear bracket 4, each being generally cup-shaped and made of aluminum; a shaft 5 rotatably supported in the housing 2 by means of rear-end and front-end bearings 6 and 7; a rotor 8 fixed to the shaft 5 and rotatably disposed inside the housing 2; a stator 9 held by an inner wall surface of the housing 2 so as to surround the rotor 8; a pair of slip rings 10 functioning as a contacted element disposed on an outer periphery of the shaft 5 projecting axially outside the rear-end bearing 6; a brush apparatus 11 disposed at an outer periphery of the slip rings 10; a rotor position detecting apparatus 12 disposed axially outside the rear-end bearing 6 for detecting a relative position of the rotor 8 relative to the stator 9; an end plate 13 fastened to the rear bracket 4 so as to cover the brush apparatus 11 and the rotor position detecting apparatus 12; and a pulley 14 fixed to an end portion of the shaft 5 projecting axially outside the front-end bearing 7. Here, the rear-end bearing 6 corresponds to a first bearing, and the front-end bearing 7 corresponds to a second bearing.

The rotor 8 includes: a pair of Lundell-type pole cores 15 (a rotor core) fixed to the shaft 5; and a rotor coil 16 installed in the pole cores 15. The stator 9 includes: a stator core 17 disposed so as to be held between the front bracket 3 and the rear bracket 4 and surround the rotor 8; and a three-phase stator coil 18 installed in the stator core 17. Fans 22 are fixed to two axial end surfaces of the pair of pole cores 15.

The brush apparatus 11 includes: a pair of brushes 19 functioning as a contact sliding in contact with outer peripheral surfaces of the pair of slip rings 10; a brush holder 20 for accommodating the brushes 19; and a brush connector unit 21 for supplying a field current to the brushes 19 from outside. The brush holder 20 and the brush connector unit 21 are molded integrally using an electrically-insulating resin such as polybutylene terephthalate (PBT), etc. Insert conductors (not shown) are insert molded into the brush holder 20 and the brush connector unit 21. Although not shown, first ends of the insert conductors project into a connector portion of the brush connector unit 21 to constitute connector terminals, and second ends are exposed at predetermined positions in the brush holder 20 to constitute brush terminals. Thus, the field current can be supplied to the brushes 19 from outside by means of the brush connector unit 21. Springs (not shown) are disposed in a compressed state inside the brush holder 20 such that each of the brushes 19 is forced toward the slip rings 10.

Next, a configuration of the rotor position detecting apparatus 12 will be explained with reference to FIG. 4.

The rotor position detecting apparatus 12 is constituted by: a sensor rotor 30, a sensor unit 31, a sensor connector unit 34, etc.

The sensor rotor 30 is configured by stacking and integrating a predetermined number of sheets of a magnetic material such as a carbon steel sheet, for example, formed into a predetermined shape by punching. An interfitting aperture 30a is disposed through a center of this sensor rotor 30. The sensor rotor 30 is mounted by press-fitting the interfitting aperture 30a onto an end portion of the shaft 5 projecting out through the rear-end bearing 6, as shown in FIGS. 1 to 3. In addition, a fixing screw 28 is fastened to an end surface of the shaft 5 to prevent the sensor rotor 30 from dislodging. Moreover, the sensor rotor 30 has an external shape formed into a curve such that gap permeance between the sensor rotor 30 and a sensor core 32 described below changes sinusoidally with angle.

The sensor unit 31 includes: a sensor core 32; and a sensor coil 33 installed in the stator core 32.

The sensor core 32 is configured by stacking and integrating a predetermined number of sheets of a magnetic material such as a carbon steel sheet, for example, formed into a predetermined shape by punching. The sensor core 32 is formed into an annular shape, twelve (first to twelfth) teeth 32a projecting radially inward are formed at a uniform angular pitch in a circumferential direction, a mounting flange portion 32b is disposed so as to extend radially outward from an outer peripheral portion of the sensor core 32, and in addition, a mounting aperture 32c is disposed through the flange portion 32b.

Here, a sensor connector unit 34 includes: a connector portion 34a and an upper holding portion 34b molded integrally using an electrically-insulating resin such as a PBT resin, etc.; and a lower holding portion 34c molded using an electrically-insulating resin such as a PBT resin, etc. Six insert conductors 35 are insert molded into the connector portion 34a and the upper holding portion 34b. First ends of each of the insert conductors 35 project inside the connector portion 34a to constitute connector terminals 35a, and second ends project outward onto the upper holding portion 34b to constitute input and output terminals 35b.

The sensor core 32 is set in the upper holding portion 34b, and the lower holding portion 34c is placed on the sensor core 32 from below and mounted to the connector portion 34a and the upper holding portion. 34b. Thus, the sensor unit 31 and the sensor connector unit 34 are configured integrally. Moreover, although not shown, each of the teeth 32a in the sensor core 32 is covered by an electrical insulator except for a tip portion.

Next, an excitation coil 33a is produced by winding a first conductor wire 36 onto all of the twelve teeth 32a sequentially as shown in FIG. 5A. Here, the first conductor wire 36 is alternately wound into left-handed windings and right-handed windings on each of the teeth 32a. In FIG. 5A, each left-handed winding is indicated by an L and each right-handed winding by an R. Then, the winding start and the winding finish of the first conductor wire 36 are soldered to input and output terminals 35b ($R_1$ and $R_2$).

A first output coil 33b is produced by winding a second conductor wire 36 onto the first, third, fifth, seventh, ninth, and eleventh teeth 32a sequentially as shown in FIG. 5B. Here, the second conductor wire 36 is alternately wound into right-handed windings and left-handed windings on each of the first, third, fifth, seventh, ninth, and eleventh teeth 32a. Then, the winding start and the winding finish of the second conductor wire 36 are soldered to input and output terminals 35b ($S_4$ and $S_2$).

A second output coil 33c is produced by winding a third conductor wire 36 onto the second, fourth, sixth, eighth, tenth, and twelfth teeth 32a sequentially as shown in FIG.

5C. Here, the third conductor wire 36 is alternately wound into right-handed windings and left-handed windings on each of the second, fourth, sixth, eighth, tenth, and twelfth teeth 32a. Then, the winding start and the winding finish of the third conductor wire 36 are soldered to input and output terminals 35b ($S_1$ and $S_3$).

The excitation coil 33a, the first output coil 33b, and the second output coil 33c produced in this manner constitute the sensor coil 33.

Next, a construction of the rear bracket 4 will be explained with reference to FIG. 4.

The rear bracket 4 is formed into a general cup shape, a central aperture 4a into which the rear-end bearing 6 is fitted being disposed through the rear bracket 4 at a position of a central axis thereof.

A first seat 40 for mounting the sensor unit 31 is formed on an end surface of the rear bracket 4 on an outer peripheral side of the central aperture 4a so as to be perpendicular to the central axis. The first seat 40, as indicated by oblique lines in FIG. 4, forms a planar shape for contacting exposed rear surface outer peripheral edge portions of the sensor core 32. A sensor unit mount threaded aperture 43a is formed in the first seat 40 with the aperture center thereof parallel to the central axis.

A second seat 41 for mounting the brush holder 20 is formed on an end surface of the rear bracket 4 on one side of the central aperture 4a so as to be perpendicular to the central axis. This second seat 41 is positioned axially forward of the first seat 40 so that the brushes 19 and the brush holder 20 do not interfere with the sensor unit 31. Brush holder mount threaded apertures 43b for mounting the brush holder 20 are formed in the second seat 41 with the aperture centers thereof parallel to the central axis.

A peripheral wall 42 projects axially outward from an end surface of the rear bracket 4 and extends so as to surround the first and second seats 40, 41 (the central aperture 4a), constituting an accommodating space 39 functioning as an accommodating portion for the sensor unit 31 and the brush holder 20. A first notch 42a for the sensor connector unit 34 to project through is formed by cutting away a portion of the peripheral wall 42, and a second notch 42b for the brush connector unit 21 to project through is formed by cutting away another portion of the peripheral wall 42. End plate mount threaded apertures 43c for mounting the end plate 13 are formed in the peripheral wall 42 with the aperture centers thereof parallel to the central axis. In addition, sensor connector unit mount threaded apertures 43d for mounting the sensor connector unit 31 are formed in end surfaces of the rear bracket 4 outside the first notch 42a of the peripheral wall 42 with the aperture centers thereof parallel to the central axis.

In addition, rear-end air intake apertures 4b are disposed through end surfaces of the rear bracket 4 radially outside the peripheral wall 42, and rear-end air discharge apertures 4c are disposed through radially outer peripheral edge portions of the rear bracket 4.

A method for mounting the brush apparatus 11 and the rotor position detecting apparatus 12 will now be explained.

First, a frame-shaped packing 37 functioning as a sealing member is mounted to the brush connector unit 21. Thus, the brush apparatus 11 is disposed such that the brush holder 20 is placed in close contact with the second seat 41 and the brush connector unit 21 projects outward through the second notch 42b. At this time, the packing 37 is disposed between the second notch 42b and the brush connector unit 21. Next, the brush apparatus 11 is mounted to the rear bracket 4 by fastening brush holder mounting screws 25 to the brush holder mount threaded apertures 43b. Thus, the brush holder 20 is disposed in the accommodating space 39, and the pair of brushes 19 are forced by the springs (not shown) to contact the slip rings 10.

Next, the sensor rotor 30 is adjusted to a predetermined angular position relative to the rotor 8 and fixed by press-fitting the interfitting aperture 30a thereof onto a rear-end end portion of the shaft 5. The sensor rotor 30 is then fixed to the shaft 5 by passing the fixing screw 28 through the interfitting aperture 30a and fastening the fixing screw 28 to an end surface of the shaft 5.

Next, a frame-shaped packing 38 functioning as a sealing member is mounted to the sensor connector unit 34. Then, the sensor unit 31 is disposed such that a rear surface outer peripheral edge portion of the sensor core 32 is placed in close contact with the first seat 40 and the sensor connector unit 34 projects outward through the first notch 42a. At this time, the packing 38 is disposed between the first notch 42a and the sensor connector unit 34. Next, the flange portion 32b of the sensor core 32 is fixed to the first seat 40 by passing a sensor unit mounting screw 26 through the mounting aperture 32c and fastening it to the sensor unit mount threaded aperture 43a. In addition, the sensor connector unit 34 is fixed to the rear bracket 4 by placing an angular U-shaped restraining segment 53 on a portion of the sensor connector unit 34 projecting through the first notch 42a, passing sensor connector unit mounting screws 27 through the restraining segment 53, and fastening them to the sensor connector unit mount threaded apertures 43d. Thus, the sensor unit 31 is disposed in the accommodating space 39.

In addition, the end plate 13 is mounted to the rear bracket 4 by placing the end plate 13 on the peripheral wall 42 and fastening end plate mounting screws 29 into the end plate mount threaded apertures 43c. Thus, the packing 37 and 38 is pressed and held between the end plate 13 and the first and second notches 42a and 42b.

Operation of an automotive dynamoelectric machine 1 constructed in this manner when used as an electric motor will now be explained.

During starting of an engine, an alternating current is supplied sequentially to each phase of the three-phase stator coil 18 by a three-phase drive circuit (not shown), and a field current is supplied to the rotor coil 16 by means of the brushes 19 and the slip rings 10. Thus, the stator coil 18 and the rotor coil 16 become electromagnets, and the rotor 8 rotates inside the stator 9 together with the shaft 5. Torque from the shaft 5 is transmitted to an output shaft of the engine by means of the pulley 14, starting the engine.

At this time, the sensor rotor 30 rotates together with the rotation of the shaft 5. Thus, a gap permeance between the sensor rotor 30 and the sensor core 32 changes sinusoidally with angle. When an excitation voltage $E_{R1\text{-}R2}$ (=E sin ω t) is applied to the first and second ends ($R_1$ and $R_2$) of the excitation coil 33a of the sensor coil 33 from outside by means of the sensor connector unit 34, a first output voltage $E_{S1\text{-}S3}$ (=K E sin ω t cos (X θ)) is output at the first and second ends ($S_1$ and $S_3$) of the first output coil 33b, and a second output voltage $E_{S2\text{-}S4}$ (=K E sin ω t sin (X θ)) is output at the first and second ends ($S_2$ and $S_4$) of the second output coil 33c. Moreover, K is a ratio of transformation, θ is a rotation angle, E is an input voltage, ω=2πf, f is an excitation frequency, t is time (in seconds), and X is an axial double angle (in this case, 2).

These two phases of output voltage $E_{S1\text{-}S3}$ and $E_{S2\text{-}S4}$ are output to an external control apparatus (not shown) by means of the sensor connector unit 34 and converted to a rotation angle. Then, the control apparatus controls the alternating current supplied sequentially to each of the phases of the three-phase stator coil 18 such that the direction of rotation of the rotor 8 is constant and a predetermined rotational frequency is achieved.

Next, operation of the automotive dynamoelectric machine when used as a generator will be explained.

When the engine is started, torque from the engine is transmitted to the shaft 5 by means of the pulley 14, rotating the shaft 5. Thus, when a field current is supplied to the rotor coil 16 by means of the brushes 19 and the slip rings 10, the rotor coil 16 is excited and becomes an electromagnet. By rotating the rotor 8 inside the stator 9 in this state, an alternating current is induced sequentially in the stator coil 18 installed in the stator core 17 and a generated voltage rises rapidly. This three-phase alternating current is input into a three-phase rectifying circuit (not shown) and rectified into a direct current. The direct-current voltage rectified by the three-phase rectifying circuit charges a battery and is supplied to an electric load.

In addition, in this automotive dynamoelectric machine 1, when the shaft 5 is rotated, the fans 22 are driven to rotate together with the rotor 8. External air is sucked inside the housing 2 through the rear-end air intake apertures 4b due to rotation of the fans 22, forming a flow in an axial direction, is deflected centrifugally by the fans 22, and is discharged outside the housing 2 through the rear-end air discharge apertures 4c. Thus, heat from the rectifier 23 and rear-end coil ends of the stator coil 18 constituting heat-generating parts inside the housing 2 is absorbed into the cooling airflow, cooling the rectifier 23 and the stator 9. Furthermore, because the cooling airflow is sucked in through the rear-end air intake apertures 4b disposed through the rear bracket 4 at the outer peripheral portions of the accommodating space 39, temperature increases in electrical connection portions and current-carrying portions of the brush apparatus 11 and the rotor position detecting apparatus 12 are suppressed.

Front-end air intake apertures 3a are disposed through end surfaces of the front bracket 3, and front-end air discharge apertures 3b are disposed through radially outer peripheral edge portions of the front bracket 3. External air is sucked inside the housing 2 through the front-end air intake apertures 3a due to the rotation of the fans 22, forming a flow in an axial direction, is deflected centrifugally by the fans 22, and is discharged outside the housing 2 through the front-end air discharge apertures 3b. Thus, front-end coil ends of the stator coil 18 are cooled.

According to Embodiment 1, the accommodating space 39 is formed on an end surface at a first axial end of the rear bracket 4 so as to surround an end portion region of the shaft 5, the brush holder 20 and the sensor unit 31 are disposed inside the accommodating space 39, the brush connector unit 21 and the sensor connector unit 34 are disposed so as to project out of the accommodating space 39, and electrical connection between the brushes 19 and the brush connector unit 21 and signal connection between the sensor unit 31 and the sensor connector unit 34 are performed inside the accommodating space 39.

Thus, the brush holder 20, the sensor unit 31, the brush connector unit 21, and the sensor connector unit 34 are separated from the stator 9 constituting a heat source, suppressing heat degradation of the brush holder 20, the sensor unit 31, the brush connector unit 21, and the sensor connector unit 34. Because the sensor unit 31 and the sensor connector unit 34 are separated from a magnetic circuit portion, noise tolerance is improved. In addition, because the brush connector unit 21 and the sensor connector unit 34 are positioned radially inside the radially outermost peripheral surface of the rear bracket 4, the degree of installation freedom of the automotive dynamoelectric machine 1 in an automotive vehicle is improved.

Because the brush holder 20 and the brush connector unit 21 are configured integrally and the brushes 19 and the brush connector unit 21 are electrically connected by the insert conductors, flexible wiring is no longer necessary, enabling reductions in the number of parts, and also enabling reductions in the size of the brush apparatus 11.

Because the sensor unit 31 and the sensor connector unit 34 are configured integrally and the sensor unit 31 and the sensor connector unit 34 are signal connected by the insert conductors 35, flexible wiring is no longer necessary, enabling reductions in the number of parts, and improving assembly, and also enabling reductions in the size of the rotor position detecting apparatus 12.

Because the accommodating space 39 is made airtight by the end plates 13, the accommodating space 39 is separated from portions outside the housing 2, improving corrosion resistance of the members accommodated inside the accommodating space 39.

Because the packing 37 and 38 is pressed and held between the end plates 13 and the first and second notches 42a and 42b, the accommodating space 39 is airtightly separated from portions outside the housing 2, improving corrosion resistance of the members which are accommodated inside the accommodating space 39.

Because the rear-end air intake apertures 4b are disposed through the rear bracket 4 at outer peripheral portions of the accommodating space 39, a cooling airflow is sucked in through the rear-end air intake apertures 4b, suppressing temperature increases in the electrical connection portions and the current-carrying portions of the brush apparatus 11 and the rotor position detecting apparatus 12. Thus, heat degradation of the electrical connection portions and the current-carrying portions of the brush apparatus 11 and the rotor position detecting apparatus 12 is suppressed, improving durability.

Now, a peripheral wall contacting an outer peripheral surface of the sensor core 32 may also be formed on an outer peripheral portion of the first seat 40. Thus, when the sensor unit 31 is mounted to the rear bracket 4, axial positioning of the sensor unit 31 is performed by placing the rear surface outer peripheral edge portion of the sensor core 32 in contact with the first seat 40, and radial positioning of the sensor unit 31 is performed by the outer peripheral surface of the sensor core 32 contacting an inner peripheral surface of the peripheral wall. Consequently, work when mounting the sensor unit 31 is facilitated and positioning of the sensor unit 31 can be performed simply.

A portion of the first seat 40 that the flange portion 32b contacts may also be formed such that the circumferential length thereof is larger than the circumferential length of the flange portion 32b. In this manner, the sensor unit 31 received by the first seat 40 is made pivotable around a central axis. Thus, fine adjustment of the circumferential position of the sensor unit 31, in other words, of the angle of the sensor unit 31 on a plane perpendicular to the central axis, is facilitated.

The mounting aperture 32c may also be formed so as to be elongated. In this manner, fine angular adjustment with the sensor unit 31 attached loosely to the rear bracket 4 is made possible, facilitating angular adjustment work.

In Embodiment 1 above, the restraining segment 53 and the sensor connector unit 34 are produced as separate parts, but the restraining segment 53 and the sensor connector unit 34 may also be formed integrally. In this manner, the number of parts can be reduced, improving mounting workability.

Embodiment 2

Figure 7:
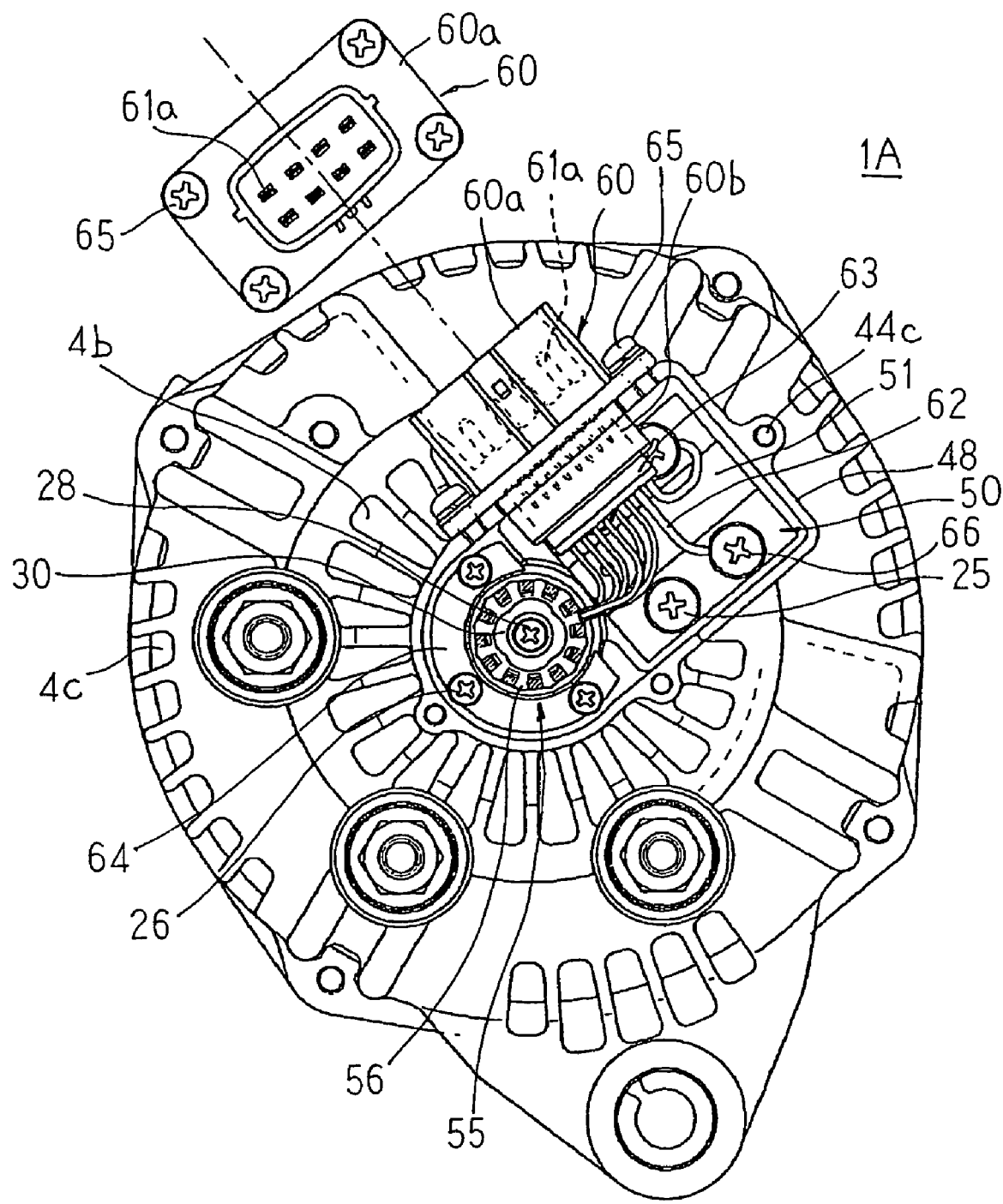
FIG. 7 is a rear-end end elevation showing an automotive dynamoelectric machine according to Embodiment 2 of the present invention.
Figure 8:
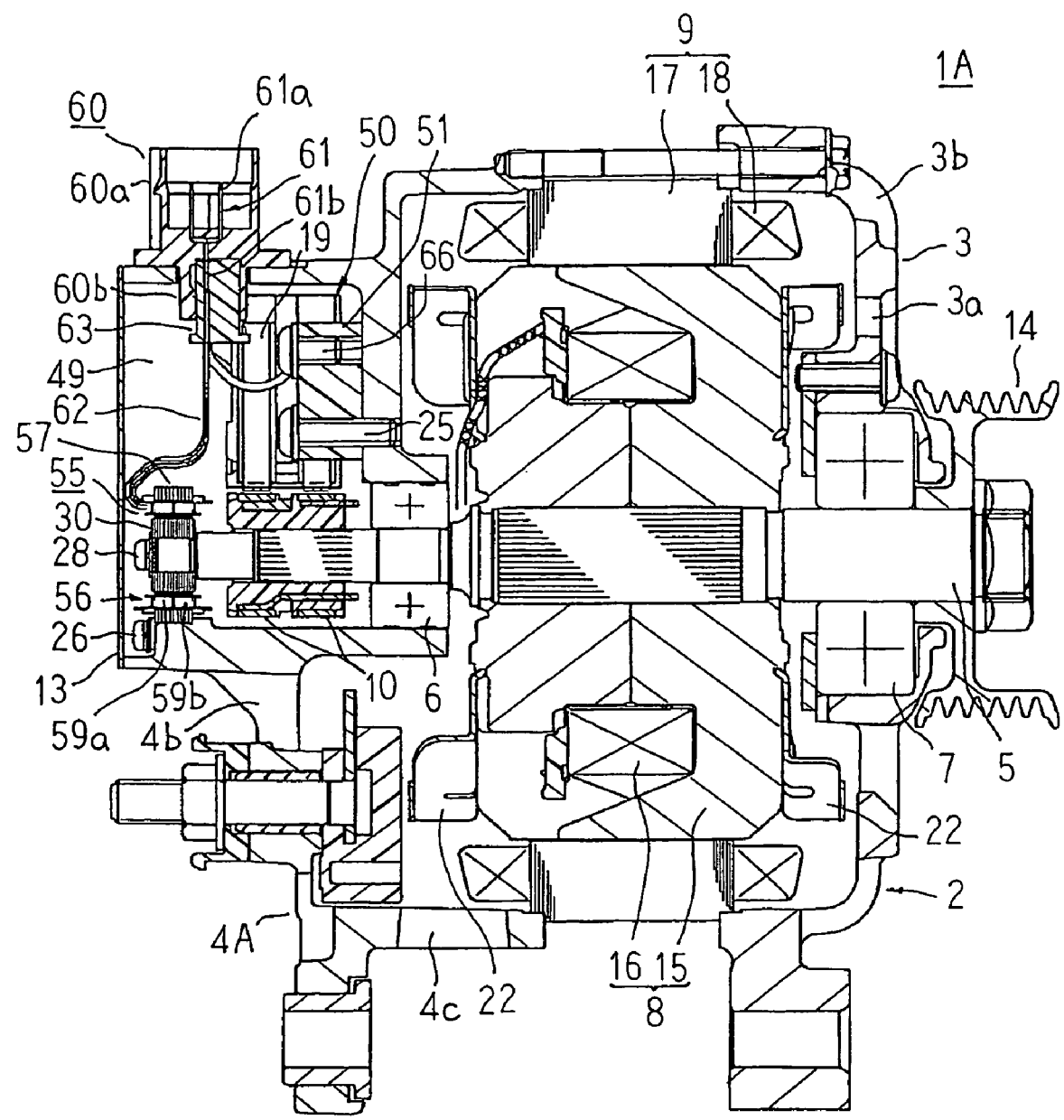
FIG. 8 is a longitudinal section showing the automotive dynamoelectric machine according to Embodiment 2 of the present invention.
Figure 9:
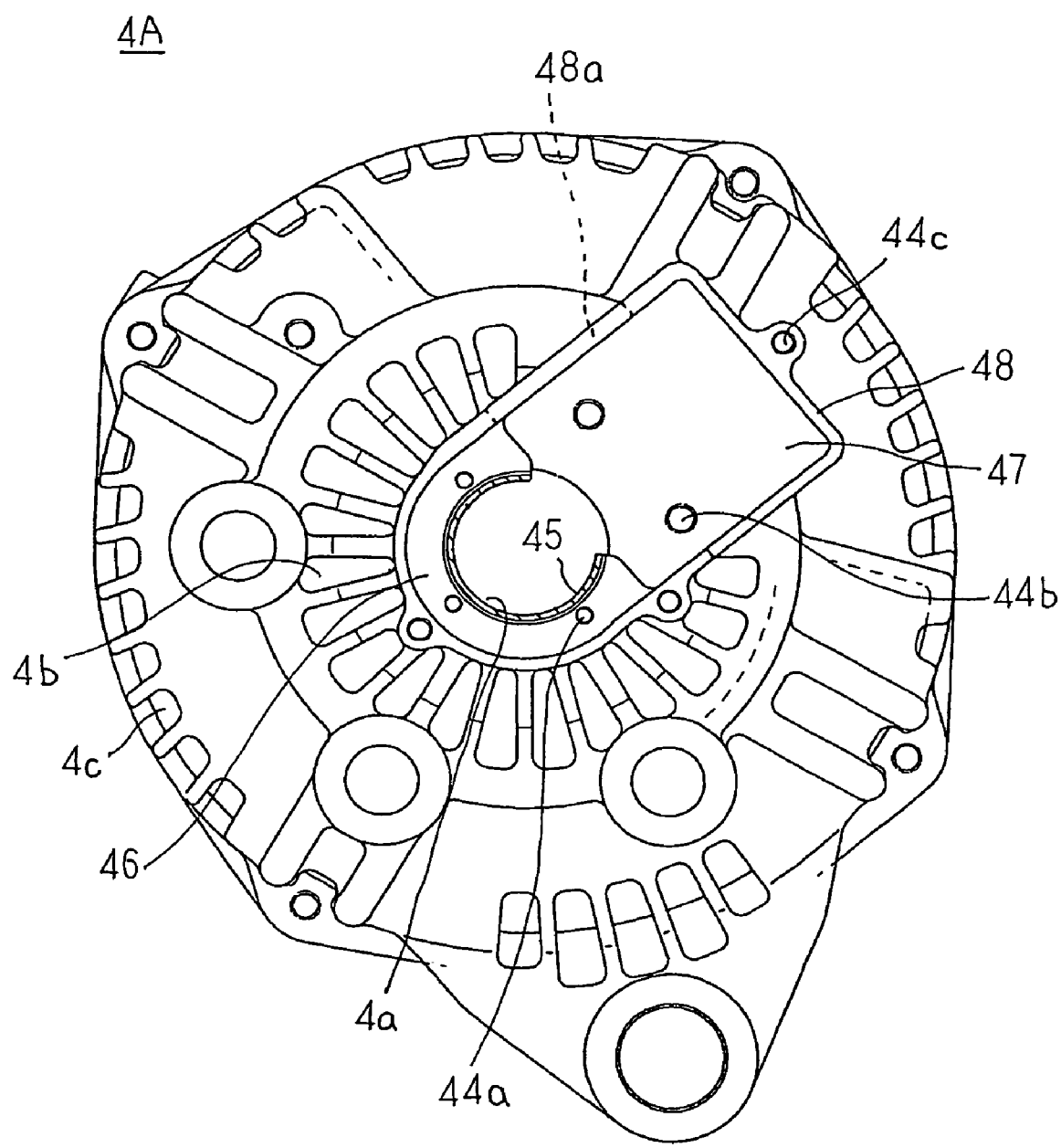
FIG. 9 is a rear-end end elevation showing a rear bracket in the automotive dynamoelectric machine according to Embodiment 2 of the present invention.
Figure 10:
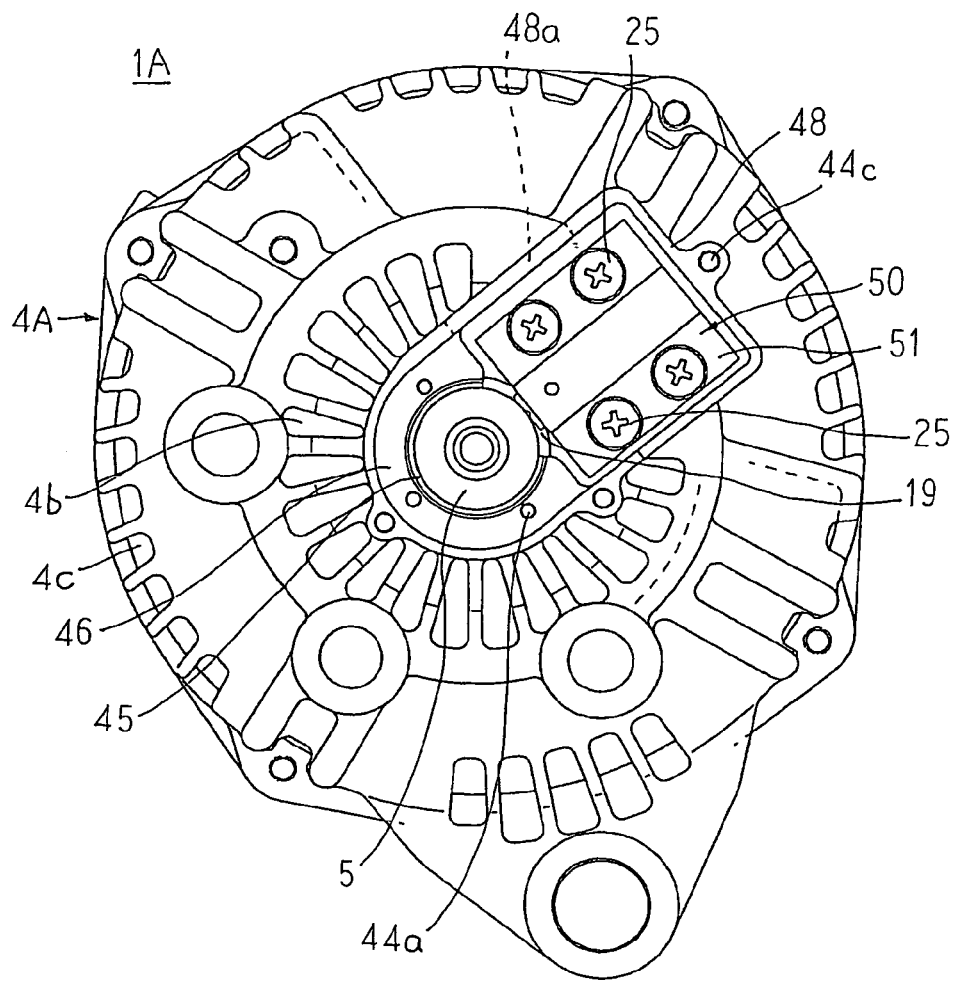
FIG. 10 is a rear-end end elevation showing a mounted state of a brush holder in the automotive dynamoelectric machine according to Embodiment 2 of the present invention.
Figure 11:
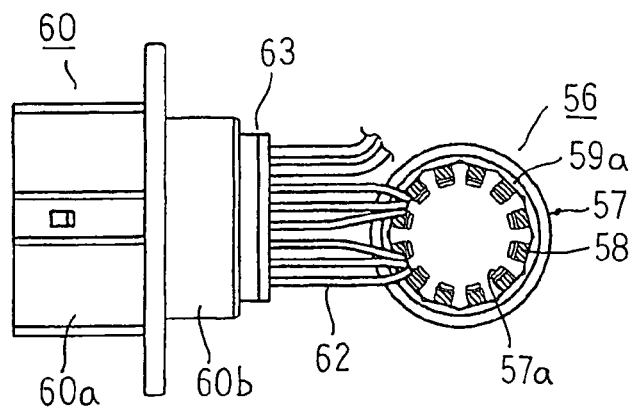
FIG. 11 is a diagram explaining a construction of a connector unit in the automotive dynamoelectric machine according to Embodiment 2 of the present invention.

FIG. 7 is a rear-end end elevation showing an automotive dynamoelectric machine according to Embodiment 2 of the present invention, FIG. 8 is a longitudinal section showing the automotive dynamoelectric machine according to Embodiment 2 of the present invention, FIG. 9 is a rear-end end elevation showing a rear bracket in the automotive dynamoelectric machine according to Embodiment 2 of the present invention, FIG. 10 is a rear-end end elevation showing a mounted state of a brush holder in the automotive dynamoelectric machine according to Embodiment 2 of the present invention, and FIG. 11 is a diagram explaining a construction of a connector unit in the automotive dynamoelectric machine according to Embodiment 2 of the present invention. Moreover, FIG. 7 shows a state in which an end plate has been removed. Portions the same as or corresponding to those in the automotive dynamoelectric machine 1 according to Embodiment 1 above will be given the same numbering below, and explanation thereof will be omitted.

First, a rear bracket 4A, as shown in FIG. 9, is formed into a general cup shape, a central aperture 4a into which a rear-end bearing 6 is fitted being disposed through the rear bracket 4A at a position of a central axis thereof.

A first seat 45 for mounting a sensor unit 56 described below, as indicated by oblique lines in FIG. 9, is formed on an end surface of the rear bracket 4A on an outer peripheral side of the central aperture 4a so as to be perpendicular to the central axis. The first seat 45 forms a C-shaped planar shape for contacting exposed rear surface outer peripheral edge portions of an annular sensor core 57 described below. In addition, a second seat 46 for mounting the sensor unit 56 is formed on an outer peripheral side of the first seat 45 so as to be perpendicular to the central axis. This second seat 46 forms a C-shaped planar shape for contacting a rear surface of a C-shaped mounting plate 64 described below. Sensor unit mount threaded apertures 44a for mounting the sensor unit 56 are formed in the second seat 46 with the aperture centers thereof parallel to the central axis. Moreover, the first seat 45 is positioned axially forward of the second seat 46, and a difference in level between the first seat 45 and the second seat 46 in an axial direction is slightly smaller than a thickness of the sensor unit 56.

A third seat 47 for mounting a brush holder 51 described below is formed on an end surface of the rear bracket 4A on one side of the central aperture 4a so as to be perpendicular to the central axis. This third seat 47 is positioned axially forward of the first seat 45 so that the brush holder 51 and brushes 9 described below do not interfere with the sensor unit 56. Brush holder mount threaded apertures 44b for mounting the brush holder 51 are formed in the third seat 47 with the aperture centers thereof parallel to the central axis.

A peripheral wall 48 projects axially outward from an end surface of the rear bracket 4A and extends so as to surround the second seat 46 and the third seat 47, constituting an accommodating space 49 functioning as an accommodating portion for the sensor unit 56 and the brush holder 51. A mounting aperture 48a for a connector unit 60 described below to project through is disposed through a portion of the peripheral wall 48. End plate mount threaded apertures 44c for mounting an end plate 13 are formed in the peripheral wall 48 with the aperture centers thereof parallel to the central axis.

In addition, rear-end air intake apertures 4b are disposed through end surfaces of the rear bracket 4A radially outside the peripheral wall 48, and rear-end air discharge apertures 4c are disposed through radially outer peripheral edge portions of the rear bracket 4A.

A brush apparatus 50, as shown in FIGS. 7 and 8, includes: a pair of brushes 19 sliding in contact with outer peripheral surfaces of a pair of slip rings 10; and a brush holder 51 for accommodating the brushes 19. The brush holder 51 is molded using an electrically-insulating resin such as PBT, etc. Insert conductors (not shown) for electrically connecting the brushes 19 and terminals of the connector unit 60 are insert molded into the brush holder 51.

This brush apparatus 50, as shown in FIG. 10, is mounted to the rear bracket 4A by placing the brush holder 51 in close contact with the third seat 47, and fastening brush holder mounting screws 25 into the brush holder mount threaded apertures 44b. Thus, the brush holder 51 is disposed in the accommodating space 49, and the pair of brushes 19 are forced by the springs (not shown) to contact the slip rings 10.

The rotor position detecting apparatus 55, as shown in FIGS. 7, 8, and 11, includes: a sensor rotor 30; and a sensor unit 56. The sensor unit 56 includes: a sensor core 57; and a sensor coil 58 installed in the stator core 57.

The sensor core 57 is configured by stacking and integrating a predetermined number of sheets of a magnetic material such as a carbon steel sheet, for example, formed into a predetermined shape by punching. The sensor core 57 is formed into an annular shape, and twelve (first to twelfth) teeth 57a projecting radially inward are formed at a uniform angular pitch in a circumferential direction. The sensor unit 56 is assembled by disposing an upper holding portion 59a and a lower holding portion 59b molded using an electrically-insulating resin such as a PBT resin, etc., so as to hold the sensor core 57 from above and below, and configuring the sensor coil 58 by winding conductor wires 36 onto each of the teeth 57a in a similar manner to that of Embodiment 1 above.

This sensor unit 56 is mounted to the rear bracket 4A by disposing the sensor core 57 so as to have a rear surface outer peripheral edge portion placed in close contact with the first seat 45, placing a C-shaped mounting plate 64 on the second seat 45 from axially outside, and fastening sensor unit mounting screws 26 into sensor unit mount threaded apertures 44a. At this time, an outer peripheral edge portion of the sensor core 57 is held between the mounting plate 64 and the first seat 45 by the fastening force of the sensor unit mounting screws 26.

The connector unit 60, as shown in FIGS. 7, 8, and 11, is molded using an electrically-insulating resin such as a PBT resin, etc. Eight insert conductors 61 are insert molded into the connector unit 60, first ends thereof projecting inside an external connector portion 60a to constitute connector terminals 61a, and second ends thereof projecting inside an internal connector portion 60b to constitute input and output terminals 61b. Flexible wiring 62 is constituted by eight conducting wires coated with an electrical insulator, a connector 63 being coupled to first ends. Six of the conducting wires in the flexible wiring 62 are bonded to end portions of the conductor wires 36 constituting the sensor coil 58.

This connector unit 60 is mounted to the rear bracket 4A by inserting it into the mounting aperture 48a from radially outside such that the internal connector portion 60b is inside the accommodating space 49, and fastening connector unit mounting screws 65 to the peripheral wall 48 from radially outside.

In addition, the two remaining conducting wires of the flexible wiring 62 are fastened to the brush holder 51 by conducting wire mounting screws 66, and the connector 63 is inserted into the internal connector portion 60*b*.

Thus, signal connection between the sensor unit 56 and the connector unit 60 is performed by means of the flexible wiring 62, and electrical connection between the brush apparatus 50 and the connector unit 60 is also performed by means of the flexible wiring 62.

Moreover, the rest of this embodiment is constructed in a similar manner to Embodiment 1 above.

Thus, in Embodiment 2, the accommodating space 49 is formed on an end surface at a first axial end of the rear bracket 4A so as to surround an end portion region of the shaft 5, the brush holder 51 and the sensor unit 56 are disposed inside the accommodating space 49, the connector unit 60 is disposed so as to project out of the accommodating space 49, and electrical connection between the brushes 19 and the connector unit 60 and signal connection between the sensor unit 56 and the connector unit 60 are performed inside the accommodating space 49. Furthermore, the accommodating space 49 is made airtight by an end plate 13, and in addition, the rear-end air intake apertures 4*b* are disposed through the rear bracket 4A at outer peripheral portions of the accommodating space 49. In addition, the connector unit 60 is positioned radially inside a radially outermost peripheral surface of the rear bracket 4A. Thus, similar effects to those in Embodiment 1 above can also be achieved in Embodiment 2.

According to Embodiment 2, because the connector unit 60 functions dually as a brush apparatus connector and as a rotor position detecting apparatus connector, one connector unit is sufficient, enabling reductions in the number of parts, and also increasing the degree of freedom when installing the automotive dynamoelectric machine 1A in an automotive vehicle.

Moreover, in Embodiment 2 above, the flexible wiring 62 is connected to the connector unit 60 by means of a connector 63, but the flexible wiring 62 may also be connected directly to the input and output terminals 61*b* of the connector unit 60 by soldering, etc.

In Embodiment 2 above, the connector unit 60 may also be fastened to the peripheral wall 48 with packing interposed, and in addition, the end plate 13 may also be fastened to the peripheral wall 48 with packing interposed. In those cases, airtightness of the accommodating space 49 is increased, improving corrosion resistance of the accommodated parts.

What is claimed is:

1. An automotive dynamoelectric machine comprising:
a housing;
a first bearing disposed in a first axial end portion of said housing;
a second bearing disposed in a second axial end portion of said housing;
a shaft rotatably supported in said housing by means of said first and second bearings;
a rotor comprising:
a rotor core fixed to said shaft and rotatably disposed inside said housing; and
a rotor coil installed in said rotor core,
a stator comprising:
a stator core supported in said housing so as to surround an outer periphery of said rotor; and
a stator coil installed in said stator core,
a contacted element fixed to an outer peripheral surface near an end portion of said shaft projecting axially outside said first bearing, said contacted element being electrically connected to said rotor coil;
a brush apparatus comprising:
a brush sliding in contact with said contacted element;
a brush holder for accommodating said brush; and
a brush connector unit for supplying a field current to said rotor coil by means of said brush and said contacted element; and
a rotor position detecting apparatus comprising:
a sensor rotor fixed to the end portion of said shaft projecting axially outside said first bearing;
a sensor unit disposed in close proximity to said sensor rotor; and
a sensor connector unit for delivering input and output signals to and from said sensor unit,
wherein:
an accommodating portion is formed on an end surface at a first axial end of said housing so as to surround an end portion region of said shaft,
said brush holder and said sensor unit are disposed inside said accommodating portion,
said brush connector unit and said sensor connector unit are disposed so as to project out of said accommodating portion,
electrical connection between said brush and said brush connector unit and signal connection between said sensor unit and said sensor connector unit are performed inside said accommodating portion, and
said sensor connector unit and said brush connector unit are constituted by a single connector unit, said sensor unit and said connector unit being connected by means of flexible wiring, said brush and said connector unit being connected by means of flexible wiring, and connection between said flexible wiring and said connector unit being made using a connector.

2. An automotive dynamoelectric machine comprising:
a housing;
a first bearing disposed in a first axial end portion of said housing;
a second bearing disposed in a second axial end portion of said housing;
a shaft rotatably supported in said housing by means of said first and second bearings;
a rotor comprising:
a rotor core fixed to said shaft and rotatably disposed inside said housing; and
a rotor coil installed in said rotor core,
a stator comprising:
a stator core supported in said housing so as to surround an outer periphery of said rotor; and
a stator coil installed in said stator core,
a contacted element fixed to an outer peripheral surface near an end portion of said shaft projecting axially outside said first bearing, said contacted element being electrically connected to said rotor coil;
a brush apparatus comprising:
a brush sliding in contact with said contacted element;
a brush holder for accommodating said brush; and
a brush connector unit for supplying a field current to said rotor coil by means of said brush and said contacted element; and a rotor position detecting apparatus comprising:
a sensor rotor fixed to the end portion of said shaft projecting axially outside said first bearing;
a sensor unit disposed in close proximity to said sensor rotor; and
a sensor connector unit for delivering input and output signals to and from said sensor unit,
wherein:

an accommodating portion is formed on an end surface at a first axial end of said housing so as to surround an end portion region of said shaft, said brush holder and said sensor unit are disposed inside said accommodating portion, said brush connector unit and said sensor connector unit are disposed so as to project out of said accommodating portion, electrical connection between said brush and said brush connector unit and signal connection between said sensor unit and said sensor connector unit are performed inside said accommodating portion, and said accommodating portion is made airtight relative to an external portion of said housing.

3. The automotive dynamoelectric machine according to claim 2, wherein:

a sealing member is interposed between said sensor connector unit and said accommodating portion and between said brush connector unit and said accommodating portion.

4. An automotive dynamoelectric machine comprising:

a housing;

a first bearing disposed in a first axial end portion of said housing;

a second bearing disposed in a second axial end portion of said housing;

a shaft rotatably supported in said housing by means of said first and second bearings;

a rotor comprising:
 a rotor core fixed to said shaft and rotatably disposed inside said housing; and
 a rotor coil installed in said rotor core, a stator comprising:
 a stator core supported in said housing so as to surround an outer periphery of said rotor; and
 a stator coil installed in said stator core, a contacted element fixed to an outer peripheral surface near an end portion of said shat projecting axially outside said first bearing, said contacted element being electrically connected to said rotor coil;

a brush apparatus comprising:
 a brush sliding in contact with said contacted element;
 a brush holder for accommodating said brush; and
 a brush connector unit for supplying a field current to said rotor coil by means of said brush and said contacted element; and a rotor position detecting apparatus comprising:
 a sensor rotor fixed to the end portion of said shaft projecting axially outside said first hearing;
 a sensor unit disposed in close proximity to said sensor rotor; and
 a sensor connector unit for delivering input and output signals to and from said sensor unit, wherein:

an accommodating portion is formed on an end surface at a first axial end of said housing so as to surround an end portion region of said shaft, said brush holder and said sensor unit are disposed inside said accommodating portion, said brush connector unit and said sensor connector unit are disposed so as to project out of said accommodating portion, electrical connection between said brush and said brush connector unit and signal connection between said sensor unit and said sensor connector unit are performed inside said accommodating portion, and an air intake aperture is disposed through said housing at an outer peripheral portion of said accommodating portion.

\* \* \* \* \*